United States Patent [19]

Tarumi et al.

[11] 4,199,985
[45] Apr. 29, 1980

[54] TEMPERATURE DETECTING DEVICE FOR IMAGE FIXING APPARATUS OF ELECTROSTATIC RECORDING APPARATUS

[75] Inventors: Noriyoshi Tarumi; Kenji Ueno, both of Hachioji, Japan

[73] Assignee: Konishiroku Photo Industry Co., Ltd., Tokyo, Japan

[21] Appl. No.: 970,638

[22] Filed: Dec. 18, 1978

[30] Foreign Application Priority Data

Dec. 30, 1977 [JP] Japan ................... 52-176151

[51] Int. Cl.² ........................................... G01K 13/08
[52] U.S. Cl. ................................... 73/351; 338/22 R
[58] Field of Search ............ 73/343 R, 351; 219/216; 355/3 FU; 338/22

[56] References Cited

U.S. PATENT DOCUMENTS

| | | | |
|---|---|---|---|
| 627,025 | 6/1899 | Turner | 73/343 |
| 2,651,203 | 9/1953 | Lamb | 73/374 |
| 2,721,925 | 10/1955 | Langer | 219/244 X |
| 3,189,729 | 6/1965 | Lusebrink | 219/244 X |
| 3,417,226 | 12/1968 | Thomiszer | 73/351 X |
| 3,648,522 | 3/1972 | Hafeli et al. | 73/351 |
| 3,926,053 | 12/1975 | Schurrer et al. | 73/351 |
| 4,000,394 | 12/1976 | Bar-On | 219/469 X |

Primary Examiner—Daniel M. Yasich
Attorney, Agent, or Firm—Bierman & Bierman

[57] ABSTRACT

A temperature detecting device for image fixing means is used in an electrostatic recording apparatus, in which a temperature sensor element is supported on a mounting member through a slender conductive element at a small distance from the surface of and in the direction of length of the fixing means to be detected, so as to detect the temperature thereof with accuracy.

1 Claim, 2 Drawing Figures

TEMPERATURE DETECTING DEVICE FOR IMAGE FIXING APPARATUS OF ELECTROSTATIC RECORDING APPARATUS

BACKGROUND OF THE INVENTION

1. Field of the Invention

The present invention relates to a temperature detecting apparatus or device for image fixing means to be used in an electrostatic recording apparatus.

For example, in the electrophotographic copying machine, a toner image developed from an electrostatic latent image produced on a photo-sensitive layer is transferred to a recording or transfer sheet and subsequently fixed to the sheet by means of heating means such as a pair of rollers containing at least one heating roller.

In the case of the standard recording or transfer sheet, the fixing temperature is usually in the range of 150° C. to 170° C. The range of the fixing temperature can be determined by conditions, for example, such as a recording speed or a thickness of the paper to be used and so forth.

Unless the fixing temperature is maintained at a constant value, an unsatisfactory fixation and scorching of the recording sheet may occur. With a view to evading such disadvantages, it is common in practice that the temperature of the heating roller is detected and utilized for temperature adjustment to maintain the preset level always.

2. Description of the Prior Art:

In most of the hitherto known temperature control systems of the above type, a thermocouple is used as the temperature sensor for the fixing means, for example a pair of rollers as described before.

To this end, the thermocouple is disposed in physical contact with the surface of the heating roller, as the result of which injuries are often produced to the heating roller as well as the mounting elements for the thermocouple.

SUMMARY OF THE INVENTION

Accordingly, an object of the invention is to provide a temperature detecting device for image fixing means to be used in an electrostatic recording apparatus including an electrophotographic copying machine which removes the disadvantages of the hitherto known temperature detecting device.

Another object of the invention is to enhance durability and reliability of the temperature sensor used in the temperature detecting device.

In view of the above and other objects which will become apparent as description proceeds. A temperature detecting device according to the invention comprises a temperature sensor element located closely to the surface of the fixing means, slender conductive elements connected to both ends of the sensor, respectively, and a mounting member for maintaining the sensor in a tensioned state through the conductive elements.

The novel features and advantages of the invention will become more apparent from detailed description of preferred embodiment of the invention taken in conjunction with the accompanying drawings.

DETAILED DESCRIPTION OF THE PREFERRED EMBODIMENTS

Figure 1:
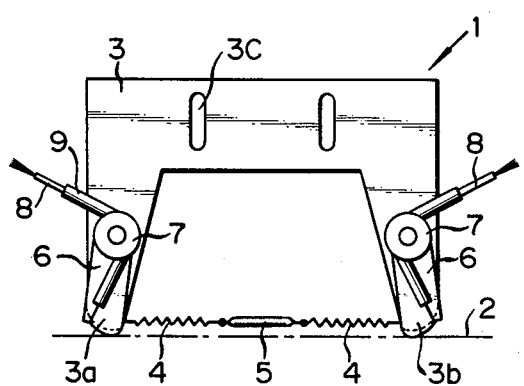
FIG. 1 is a schematic front view of a temperature detecting device according to an embodiment of the invention.
Figure 2:
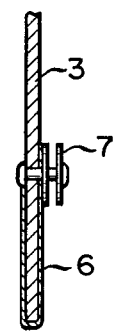
FIG. 2 is an enlarged sectional view of the same taken along the line II—II in FIG. 1.

Referring to FIG. 1, the temperature detecting device according to the invention denoted generally by reference numeral 1 is disposed adjacent to a fixing means, for example a pair of heating rollers 2 (shown only schematically). The sensor is constituted by a thermistor 5 tightened or suspended between legs 3a and 3b of a mounting member 3 by a pair of slender conductive elements 4 in a form of coil springs connected to both ends of the sensor, respectively. Further the sensor 5 is closely located adjacent to the surface of the fixing means 2, the gap being held at about 1 mm in the embodiment as described hereinafter. The sensor 5 is mounted in the direction of the length of the fixing means 2.

Naturally, the relation of the sensor and fixing means can be changed freely but above described relation is a preferable relationship.

The conductive elements 4 are preferably made of a heat-sensitive material, more particularly a heat sensitive and electrical conductive material.

The mounting member 3 is formed of a thin metal sheet material and has slots 3c through which the temperature detecting device may be secured to a stationary portion of the recording apparatus in any suitable manner. The end portions of the legs 3a and 3b are coverd with a heat-resistive insulation material 6 such as Teflon tape or the like.

Reference numeral 7 denotes securing means for lead wires 8 of the sensor 5, and is also made of a heat-resistive insulation material such as mica plate and secured to the legs 3a and 3b by means of screws or rivets. The lead wires 8 are connected to the respective coil springs 4 which serve also as electric conductors and held fixedly by the securing discs 7 in cooperation with notches formed in the end portions of the legs 3a and 3b, respectively, as can be seen from FIG. 1.

The arrangement of the temperature detecting device according to the invention in which the sensor or thermistor 5 is held in a resiliently tensioned state by a pair of the electric conductors 4 implemented in form of the coil or compression springs positively prevents contact between the heating roller 2 and the sensor or thermistor 5 even if the conductor 4 undergoes thermal linear expansion under the heating of the roller 2. Further. by virtue of the coating or the covering of the leg end portions with the heat-resistive insulation material, heat transfer to the supporting or mounting plate 3 can be significantly reduced. Formation of a short-circuit between the electric conductors (4 and 8) and the mounting plate 3 can be excluded by the function of the heat-resistive insulation material 6 and an insulating sleeve 9 of the lead conductor 8. It is preferred that the lead conductor 8 and the spring conductor 4 be secured to the securing disc means 7 at the junction between these conductors.

The invention is not restricted to the arrangement described above, but many modifications and variations will readily occur to those skilled in the art without departing from the scope and spirit of the invention as defined in the claims.

What is claimed is:

1. A temperature detecting device for heating image fixing means to be used in electrostatic recording apparatus, comprising a mounting member having a pair of dependent legs, adapted to be attached to the electrostatic recording apparatus, heat resistant insulating material covering said legs, an electric temperature detecting element, and a pair of electrically conductive elements each connected at one end to said temperature detecting element and supported at their other end by the insulated legs of said mounting member for resiliently holding said temperature detecting element spaced from but adjacent the heating surface of the image fixing means.

* * * * *